(12) United States Patent
Sadowski et al.

(10) Patent No.: US 9,639,488 B2
(45) Date of Patent: May 2, 2017

(54) ENCODING VALID DATA STATES IN SOURCE SYNCHRONOUS BUS INTERFACES USING CLOCK SIGNAL TRANSITIONS

(71) Applicant: Advanced Micro Devices, Inc., Sunnyvale, CA (US)

(72) Inventors: Gregory Sadowski, Cambridge, MA (US); Sudha Thiruvengadam, Austin, TX (US); Arun Iyer, Karnataka (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 221 days.

(21) Appl. No.: 14/310,215

(22) Filed: Jun. 20, 2014

(65) Prior Publication Data

US 2015/0372802 A1    Dec. 24, 2015

(51) Int. Cl.

| G06F 1/04 | (2006.01) |
|---|---|
| G06F 13/38 | (2006.01) |
| G06F 1/00 | (2006.01) |
| H04L 7/00 | (2006.01) |

(52) U.S. Cl.
CPC ............... G06F 13/38 (2013.01); G06F 1/00 (2013.01); G06F 1/04 (2013.01); H04L 7/0008 (2013.01)

(58) Field of Classification Search
CPC ..... G06F 1/04; G06F 1/08; G06F 1/10; G06F 1/12

USPC .......................................... 713/322, 400, 600
See application file for complete search history.

(56) References Cited

U.S. PATENT DOCUMENTS

| 6,782,486 B1* | 8/2004 | Miranda | G06F 1/10 713/322 |
|---|---|---|---|
| 6,822,478 B2* | 11/2004 | Elappuparackal | G06F 1/04 326/46 |
| 2008/0129359 A1* | 6/2008 | Lee | H03K 3/0375 327/210 |
| 2012/0030500 A1* | 2/2012 | Iyer | G06F 1/10 713/503 |
| 2012/0223749 A1* | 9/2012 | Sasaki | H03K 5/135 327/141 |
| 2013/0121383 A1* | 5/2013 | Sadowski | G11C 7/1066 375/211 |

* cited by examiner

*Primary Examiner* — Chun Cao
(74) *Attorney, Agent, or Firm* — Staniford Tomita LLP

(57) ABSTRACT

Embodiments are described for a method of reducing power consumption in source synchronous bus systems by reducing signal transitions in the system. Instead of sending clock and data valid signals, only the start and end of valid data packets are marked by clock signal transitions, or only a number of clock pulses that corresponds to number of data words is sent, or only a number transitions on clock signals are sent. The clock signal transitions may comprise either clock pulses or exclusively rising edge or falling edge transitions of the clock signal.

18 Claims, 6 Drawing Sheets

```
┌─────────────────────────────────────┐
│  TRANSMIT CLOCK AND DATA FROM TRANSMITTER │
│  TO RECEIVER IN A SOURCE SYNCHRONOUS BUS  │
│             INTERFACE                │
│                              902     │
└─────────────────┬───────────────────┘
                  ▼
┌─────────────────────────────────────┐
│  ENCODE CLOCK SIGNAL WITH THE DATA VALID │
│  SIGNAL TO GENERATE ENCODED (GATED) CLOCK │
│              SIGNAL                  │
│                              904     │
└─────────────────┬───────────────────┘
                  ▼
┌─────────────────────────────────────┐
│  USE THE ENCODED CLOCK SIGNAL TO PASS VALID │
│  DATA USING EITHER CLOCK PULSE OR CLOCK    │
│     TRANSITIONS AS LATCH TRIGGER    │
│                              906     │
└─────────────────┬───────────────────┘
                  ▼
┌─────────────────────────────────────┐
│  OPTIONALLY USE TRANSMITTED CODE OR │
│  INTERNALLY GENERATED CLOCK TO ELIMINATE │
│ CLOCK TRANSITIONS BETWEEN VALID DATA BURSTS │
│                              908     │
└─────────────────────────────────────┘
```

FIG. 9

ENCODING VALID DATA STATES IN SOURCE SYNCHRONOUS BUS INTERFACES USING CLOCK SIGNAL TRANSITIONS

TECHNICAL FIELD

Embodiments relate generally to bus transmission protocols, and more specifically to reducing switching power in source synchronous bus transmission systems.

BACKGROUND

Reducing power consumption during data transfers in the interconnects of integrated circuits (ICs) is important in the development of IC design. Certain methods have been developed to efficiently transfer data, including source synchronous interfaces. Source synchronous interfaces are often used in high-speed data transfer applications, such as double data rate (DDR) synchronous DRAM systems. Source synchronous clocking refers to the technique of sourcing a clock along with data on the same line. The timing of unidirectional data signals is referenced to a clock sourced by the same device that generates those signals, and not to an external or global clock that is generated by a bus master. Source synchronous bus transmission protocol uses clock, and data-valid signals to mark in time when the transmitted data is valid. In general, the switching power in a circuit is directly proportional to the bus throughput (frequency of the bus) and the physical length of the bus. As the lengths between repeaters in source synchronous bus systems are longer than the regular synchronous buses, the source synchronous bus is a better power-solution for long bus connections. It is thus especially important to reduce power in these systems.

FIG. 1A illustrates a typical source synchronous bus interface transmitting data between and transmitter 101 and receiver 103, as presently known. The clock is sourced from the same device as the data, and latches the data on either a clock edge or shifted clock edge. FIG. 1B illustrates the timing of a source synchronous bus at the transmitter 101, as known in prior art systems. The timing diagram of FIG. 1B shows the timing relationships between a periodic clock signal 102, data 106, and the data valid signal (valid) 104. The data 106 is valid only during the clock periods during which the data valid signal 104 is active. In present source synchronous bus systems, the clock signal 102 is sent until the data reaches the receiver stage. It should be noted that the data line shown in FIG. 1A represents any number of signals and wires depending on the size of the data bus.

One issue associated with source synchronous circuits is that the transitions of the clock and valid signals contribute to overall power consumption in the IC. Source synchronous bus circuits send data, data-valid, and clock signals together from a transmitter through a number of repeaters to a receiver. The toggling clock and data valid signals draw power, which can become excessive under certain operational conditions. To overcome issues, such as power consumption, certain known systems manage the clock signal. For example, clock gating may be used in source-destination synchronous bus protocols. In source synchronous bus systems with clock gating, as the repeaters invert the clock signal, they require the clock to be driven by the transmitter until the data arrives at the destination.

Another issue with source synchronous circuits is the potential of generating electrical noise, which may cause timing instability. Source synchronous bus systems rely on clock signal availability as the data is transmitted so that the data and clock signals are sent together. However, variability along the transmission lines requires the clock to have a register refresh as it travels along the bus. In present systems, the clock toggles continuously and each transition requires a recharge of the entire length of the clock line such that the change is propagated through the entire bus. The recharge of the bus costs power, and also generates some amount of electrical noise, which may leak into timing of signals. This noise leakage may in turn cause synchronization problems.

What is needed therefore, is a system that minimizes signal transitions in a source synchronous bus system to reduce power consumption, minimize noise generation and improve timing synchronicity.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY OF EMBODIMENTS

Some embodiments are described for a method and system of reducing power consumption in source synchronous bus systems by reducing signal transitions in the system. For example, instead of sending clock and valid signals, only start and end of valid data are marked by clock signal transitions, or only a number of clock pulses that corresponds to number of data units is sent, or only a number transitions on clock signals are sent.

A method of reducing clock transitions in a source synchronous bus interface under an embodiment begins with the transmission of clock and data signals in a source synchronous bus interface. The clock signal is encoded with the data valid signal to generate an encoded clock signal, which is essentially the clock signal gated by the data valid signal. The encoded clock signal is then used to pass the valid data and block the invalid data based on the original data valid signal. The clock transitions used to latch the data can be either the clock pulses or the clock transitions. In an alternative embodiment, the transmitter may use a code or internally generated clock that is decoded in the receiver to indicate the presence of valid data, or a number indicating the number of consecutive valid data packets to be transmitted to the receiver without requiring clock signal transitions.

In an alternative embodiment, the data content itself is used to reduce the number of clock transitions. In this method the clock signal is encoded with the data valid signal to generate an encoded or gated clock signal. The transmitter performs a pair-wise comparison of data packets to determine difference between consecutive data packets. The encoded clock signal is then used to pass the valid data and block the invalid data based on the differences between consecutive data packets. The clock transitions used to latch the data can be either the clock pulses or the clock transitions.

Embodiments are also directed to source synchronous bus interface circuits that comprise transmitter, receiver, and one or more repeater components to encode the clock signal with the data valid signal according to one or more methods described herein. Thus, some embodiments are directed to an apparatus or system comprising one or more processing elements that perform the acts or process steps of the two methods described above.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 9 is a flowchart that illustrates a method of reducing clock transitions in a source synchronous bus interface under an embodiment.

DETAILED DESCRIPTION

Embodiments are generally directed to systems and methods of reducing the number of transitions in clock and data-valid signals used in source synchronous bus interfaces as a way to reduce switching power consumption, reduce clock noise, and improve signal stability.

Figure 1A:
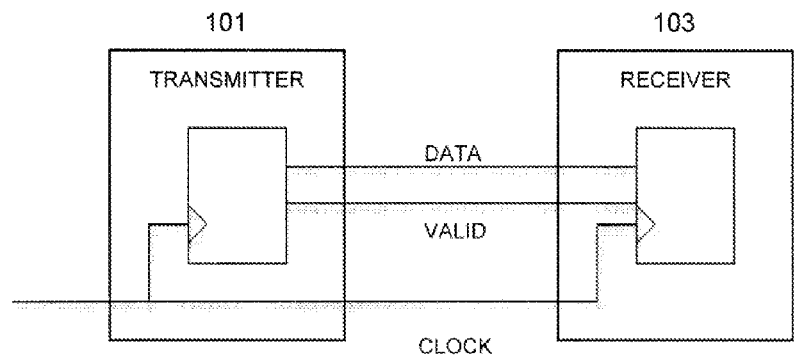
FIG. 1A illustrates a typical source synchronous bus interface transmitting data between and transmitter and receiver, as presently known.
Figure 1B:
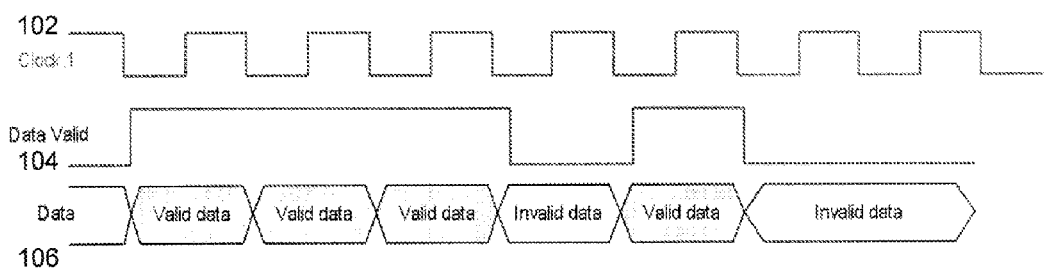
FIG. 1B illustrates the timing of a source synchronous bus at the transmitter, as known in prior art systems.
Figure 2:
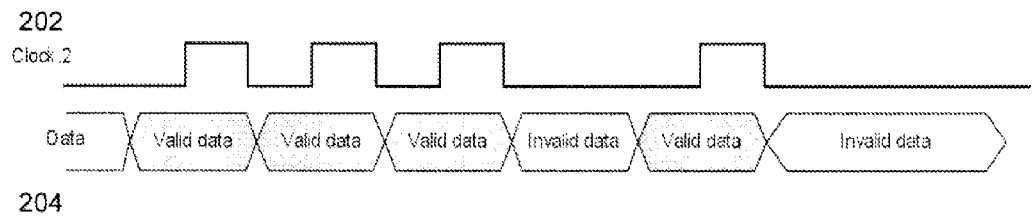
FIG. 2 is a timing diagram that illustrates a clock gating scheme that reduces clock transitions, under a first embodiment.

In one embodiment, a source synchronous bus interface includes a circuit that sends a clock transition for every valid data period in order to minimize the number of transitions on clock and data-valid signals. FIG. 2 is a timing diagram that illustrates a clock gating scheme that reduces clock transitions, under a first embodiment. As shown in FIG. 2, clock signal 202 is gated such that every transition indicates the latching of valid data 204; clock pulses go through during the data valid period. If the clock signal (clock.2) 202 does not transition, the data packet is not recognized as valid. For this embodiment, the periodic clock signal (e.g., 102) is gated using a data valid signal such that one clock cycle is passed per valid data period. This is a relatively simple solution that does not require additional complex circuitry on either the transmitter-side 101 or receiver-side 103. It also does not require dual-edge flops in the repeater stages of the clock/data line, and eliminates the need to send a data-valid signal. This type of interface is generally suitable for shorter interconnects between repeaters since there are still transitions needed for each valid data packet, but no overly complex additional circuit requirements.

It should be noted that for purposes of description, that in conjunction with the word "data," the terms unit, packet, word, burst, and the like may all be used to refer to a basic unit of data that is latched according to a clock signal in a source synchronous bus interface, and that as a group is either valid or invalid, as shown in FIG. 2, for example. Such data units are generally of equal length to one another and may be on the order of 8-bits, 16-bits, 32-bits, and so on, depending on the configuration of the bus interface.

Figure 3:
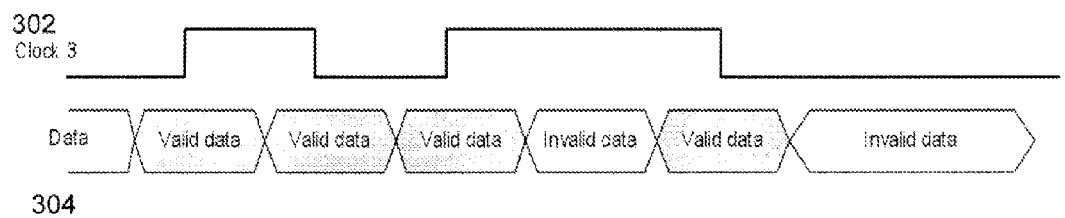
FIG. 3 is a clock diagram that illustrates a clock gating scheme that reduces clock transitions, under a second embodiment.

FIG. 3 is a timing diagram that illustrates a clock gating scheme that reduces clock transitions, under a second embodiment. For this embodiment, the system sends a clock transition for every valid data period, as opposed to a clock cycle per valid data period, as shown in FIG. 2. As shown in FIG. 3, the clock signal (clock.3) 302 is encoded with the data valid signal such that its rising or falling edges indicates the presence of valid data on the data line 304. If there is no clock transition, the data packet(s) are not valid. For the embodiment of FIG. 3, there are generally no wasteful transitions on the clock signal, and the system does not send the data-valid signal at all. The timing scheme of FIG. 3 generally requires a transmitter circuit that combines the periodic clock signal with the data valid signal, and a circuit in the receiver that can decode the clock/data_valid protocol. In an embodiment, a divide-by-two circuit in the transmitter generates the clock signal 302. As compared with the timing scheme of FIG. 2, this embodiment is generally more useful for systems with longer interconnects between repeaters since the number of transitions is greatly reduced and the data valid signal is eliminated, but some extra circuitry is required in the transmitter and receiver stages.

Figure 4:
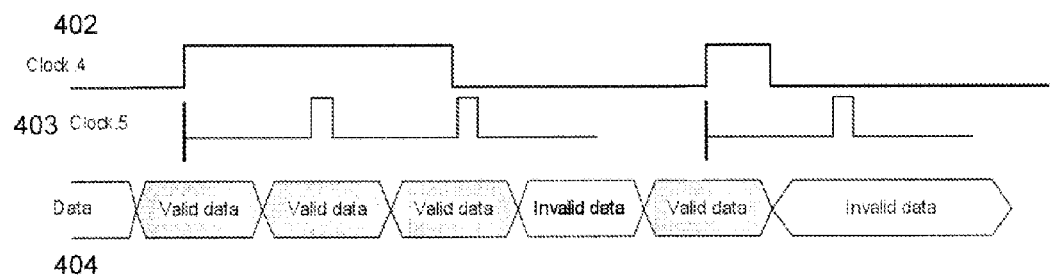
FIG. 4 is a timing diagram that illustrates a data clocking scheme that reduces clock transitions, under a third embodiment.

FIG. 4 is a timing diagram that illustrates a data clocking scheme that reduces clock transitions, under a third embodiment. In this embodiment, the system sends two transitions on clock signal 402 (clock.4) for each valid data burst. The rising edges indicate the start of valid data packets and the falling edges indicate the end of valid data packets. As shown in FIG. 4, the data valid signal is eliminated and clock transitions are greatly reduced since only two transitions per valid data burst (of any length of data packets) is required. For this embodiment, the receiver and any intermediate repeaters are programmed or synchronized with the transmitter to recognize the clock transitions in relation to the valid data packets. For the embodiment of FIG. 4, the receiver (and any intermediate repeaters) generate their own internal clock signal 403 (clock.5) to mark the beginning of the data transmission and the first transmitter clock 402 transition. This may be accomplished through the use of a one-shot circuit to generate the internal clock pulses 403 along with a timer circuit. Each internal clock pulse 403 takes new data from the bus. A low state on the clock 402 line disables the internal clock 403 and forces the circuit to an idle state. The advantage of this embodiment is that there are no clock transitions when the data burst is long, and it is thus very efficient for systems that feature long interconnect lines.

As shown in FIG. 4, the internal receiver clock signal 403 is generated upon every transition of the transmitter clock signal 402, and provides synchronization between the receiver/repeater and the transmitter with respect to the clock signal 402 transitions, and specifically to the rising edge of the clock signal. Instead of internally generated clock signals, other programming methods may be used to synchronize or program the receiver, such as through a separate communication channel from the transmitter. In an alternative embodiment, the method of FIG. 4 can be modified for situations in which a known number of data words (fixed burst size) is always sent from the transmitter. In this case, the transmitter sends a command or data object that represents the fixed and programmable number of data words that will be transmitted. For this embodiment, the system only needs to send a transition on the clock signal indicating the start of the data burst. The receiver will then know that data received after the fixed number of words is invalid until the next valid signal or program word is sent.

Figure 5:
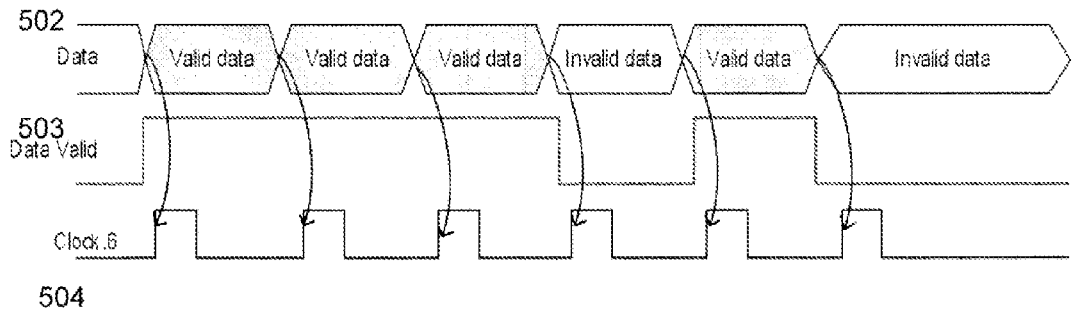
FIG. 5 illustrates a case of latching valid data on rising clock edges using an internally generated clock, under an embodiment.

Certain previous embodiments described ways in which clock transitions were reduced by incorporating the data valid signal into the clock signal by gating or other encoding methods without sending the data valid signal across the bus. In this way, the data valid signal is not sent from the transmitter, but is used to minimize clock transitions in the receiver. In an embodiment, characteristics associated with the data itself can be used in such a way that the clock transitions are reduced by signaling the boundary between consecutive data pieces based on the data content. FIG. 5 illustrates a case of latching valid data on rising clock edges using an internally generated clock, under an embodiment. As shown in FIG. 5, valid data packets are latched on the rising edge of the clock 504 signal (clock.6) whenever the data valid line 503 is high, and clock pulses that occur during data valid low periods have no effect. In an embodiment, the transmitter and receiver circuits are configured to generate clock pulses based on a comparison of the data between successive data packets. In an embodiment, the clock 504 signal is not provided externally but is an internal clock that is derived in the receiver/repeater from the data stream.

Figure 6:
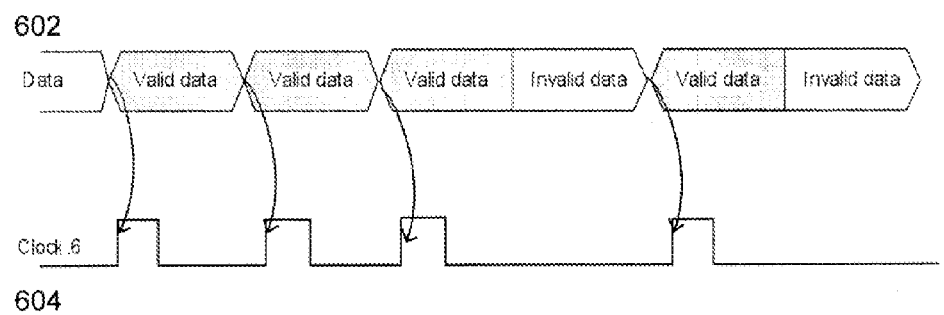
FIG. 6 illustrates a timing diagram that illustrates a data clocking scheme that reduces clock transitions, under a fourth embodiment.

FIG. 6 is a timing diagram that illustrates a data clocking scheme that reduces clock transitions under an embodiment that uses such data comparison methods. For this embodiment, data packets 502 of a certain size (e.g., 16, 32, 64 bits, etc.) are transmitted along with a data valid signal 503 that goes high for valid data and low for invalid data. The transmitter is configured to compare consecutive packets and determine whether or not there is any difference between the pair of data packets. A data packet that is identical to a previous data packet will cause the clock signal to not transition. Thus, the transmitter will send the data-valid signal to indicate when the data is valid or it ensures that the invalid data is exactly the same as the previous data on the bus, so the clock pulse will not be generated. For this embodiment, the transmitter may include a comparator circuit that compares entire data packets between every two consecutive data packets, or it may compare parts of the data packets in cases where the data packets are relatively large (e.g., 32-bits or greater). In this case, the transmitter may be configured to compare the last 16-bits of the packets, under the presumption that if the packets are identical, these last 16-bits will be the same, and if they are not identical, these last 16-bits will be different. The comparator circuit in the transmitter may be a bit-wise comparator, hash comparator, or other similar comparator that compares data packets to one another. For the embodiment of FIG. 6, the data valid signal 503 is not required as the comparator function helps to embed the data valid signal into the clock 604 signal based on the pair-wise comparison of the data packets 602. The embodiment of FIG. 6 saves clock transitions in the case that the transmitter has no new data, or when the invalid data is identical to the valid data. No clock 604 pulse is generated, and no data valid signal required.

Figure 7:
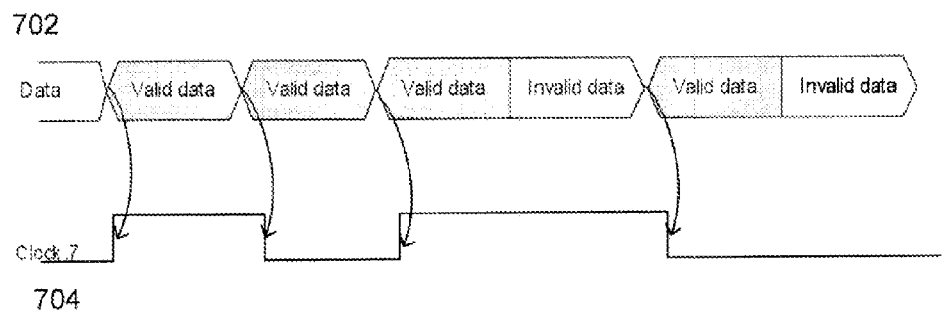
FIG. 7 illustrates a timing diagram that illustrates a data clocking scheme that reduces clock transitions, under a fifth embodiment.

As shown in FIG. 6, the valid data is latched through individual clock pulses. Alternatively, the valid data can be latched using clock signal transitions to further reduce the number of required transitions. FIG. 7 illustrates an alternative embodiment in which clock transitions are used instead of clock pulses to latch non-identical data packets. As shown in FIG. 7, to further reduce the switching power of the clock signal 704 (clock.7), the transmitter generates the transitions only when the data 702 is changing. This eliminates the falling edges of the clock signal shown in FIG. 6, and can be accomplished through a clock gating function. In an embodiment, the clock 704 signal is not provided externally but is an internal clock signal that is derived in the receiver/repeater from the data stream.

Figure 8:
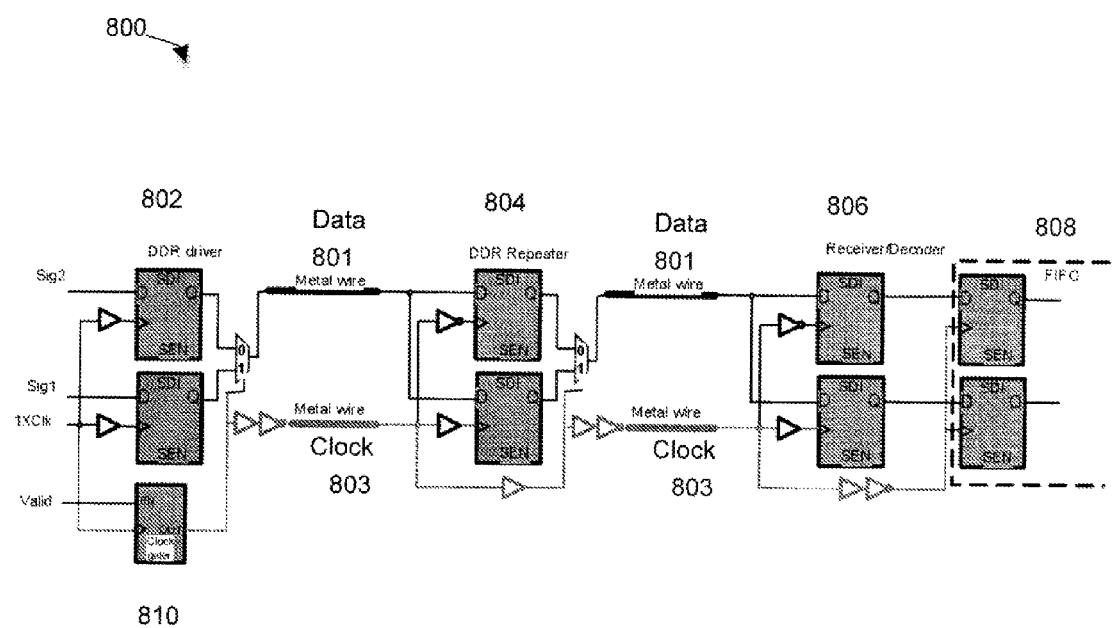
FIG. 8 illustrates an example of a source synchronous bus interface that implements one or more embodiments of a clock gating circuit to reduce clock transitions.

Depending on system requirements and constraints, any of the above embodiments may be used alone or in conjunction with each other to reduce the power consumption associated with clock latching of valid data packets in a source synchronous bus interface. Such a bus interface may be a circuit used in a high-speed single or double data rate memory system, such as a DDR SDRAM system that comprises a transmitter and receiver coupled to each other through one or more repeaters to form a long data/clock bus interface. FIG. 8 illustrates an example of a source synchronous bus interface that implements one or more embodiments of a clock gating circuit to reduce clock transitions. Circuit 800 of FIG. 8 comprises components of a DDR system including a transmitter (driver) 802 transmitting data and clock signals to a receiver 806 through one or more repeater stages 804. The data line 801 may represent any number (n) data lines depending on the width of the bus. Two input signals denoted Sig1 and Sig2 are input to respective flip-flops in the transmitter and are multiplexed together to form the single data line 801. Each repeater 804 contains the same flip-flop multiplexer arrangement, and the receiver 806 includes two flip-flops for the multiplexed data. A FIFO buffer circuit 808 at the output of controller 806 is provided to resolve the phase difference between the data signals at the receiver as compared to the transmitter.

The embodiment of FIG. 8 also includes a clock gating circuit 810 that serves to gate the clock 803 using the input data valid (Valid) signal. As shown in FIG. 8, only the data 801 and clock 803 lines travel along the bus through the repeaters 804 to the receiver 806, and no data valid signal is sent. The clock gating circuit 810 generally implements the gating function illustrated in the embodiments illustrated in FIGS. 2, 3, 4, and 7.

The circuit of FIG. 8 may be further modified by including one or more encoder circuits in the transmitter 802 and decoders in the receiver 806 to encode command words or to create internally generated clock signals, as described with reference to the embodiments of FIG. 4.

Embodiments are directed to methods and circuits that reduce that power consumption in a source synchronous bus interface, such that instead of sending clock and valid signals, only start and end of valid data are marked by clock signal transitions. Alternatively only a number of clock pulses that corresponds to number of data packets is sent, or only a number transitions on clock signals are sent. FIG. 9 is a flowchart that illustrates a method of reducing clock transitions in a source synchronous bus interface under an embodiment. The process of FIG. 9 begins with the transmission of clock and data signals in a source synchronous bus interface, 902. The clock signal is encoded with the data valid signal, such as through encoder circuit 810 of FIG. 8, to generate an encoded clock signal, which is essentially the clock signal gated by the data valid signal, 904. The encoded clock signal is then used to pass the valid data and block the invalid data based on the original data valid signal, 906. The clock transitions used to latch the data can be either the clock pulses as shown in FIG. 2, or the clock transitions as shown in FIG. 3. Corresponding to the embodiment illustrated in FIG. 4, the transmitter may alternatively use a code or internally generated clock that is decoded in the receiver to indicate the presence of valid data, or a number indicating the number of consecutive valid data packets to be transmitted to the receiver without requiring clock signal transitions, 908.

Figure 10:
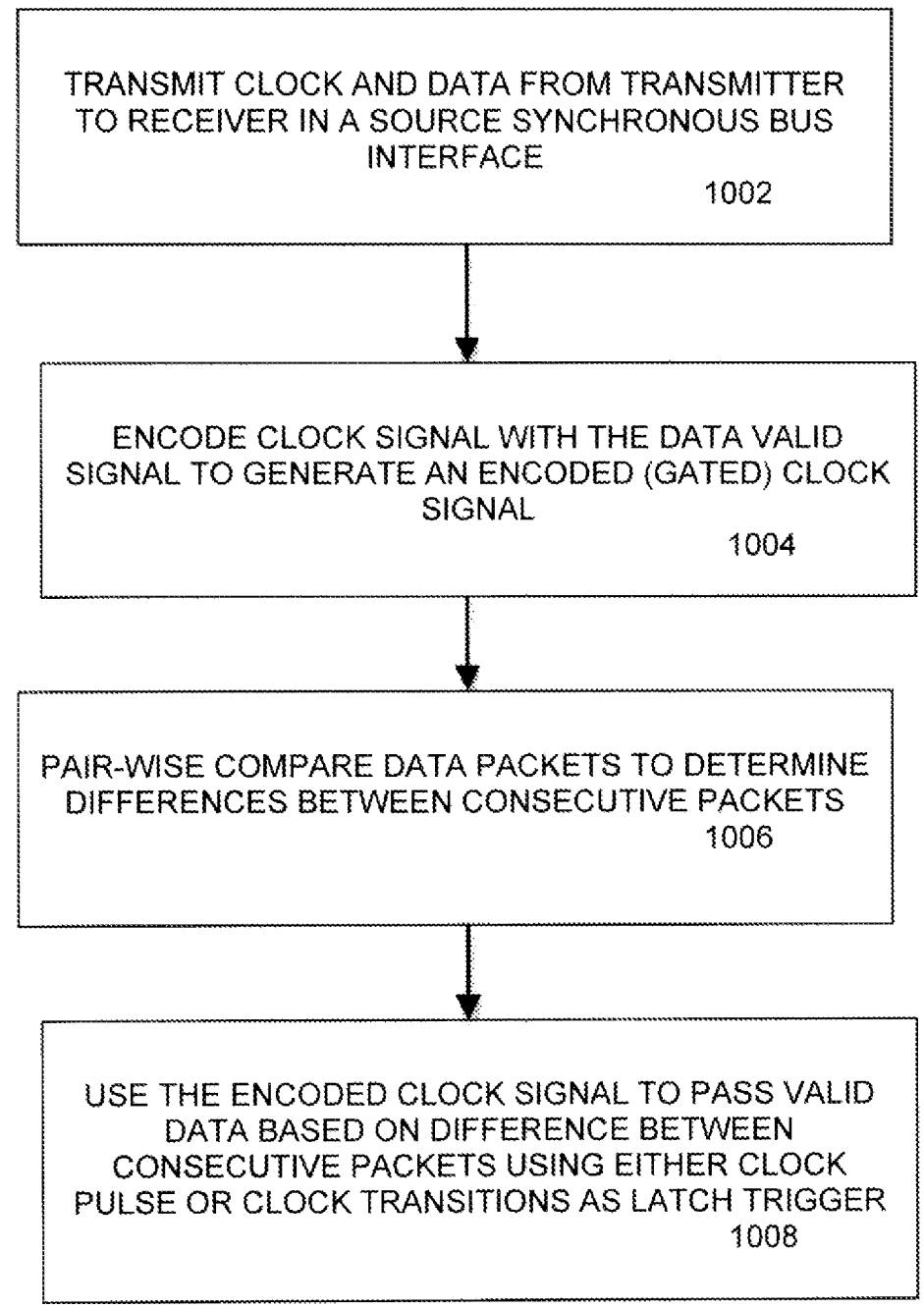
FIG. 10 is a flowchart that illustrates a method of reducing clock transitions in a source synchronous bus interface under an alternative embodiment.

FIG. 10 is a flowchart that illustrates a method of reducing clock transitions in a source synchronous bus interface under an alternative embodiment, such as shown in FIGS. 6 and 7. This method starts with the transmission of clock and data signals in a source synchronous bus interface, 1002. The clock signal is encoded with the data valid signal, such as through encoder circuit 810 of FIG. 8, to generate an encoded clock signal, which is essentially the clock signal gated by the data valid signal, 1004. The transmitter performs a pair-wise comparison of data packets to determine difference between consecutive data packets, 1006. The encoded clock signal is then used to pass the valid data and block the invalid data based on the differences between consecutive data packets, 1008. The clock transitions used to latch the data can be either the clock pulses as shown in FIG. 2, or the clock transitions as shown in FIG. 3.

Any of the embodiments described herein may be used alone or together with one another in any combination. The one or more implementations encompassed within this specification may also include embodiments that are only partially mentioned or alluded to or are not mentioned or alluded to at all in this description or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

For purposes of the present description, the terms "component," "module," "circuit," and "process," may be used interchangeably to refer to a circuit element or processing unit that performs a particular function. Such a function may be implemented purely in hardware or it may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media. Under some embodiments, the computer readable media may store program code or software instructions that are executed by a computer system and cause the computer system to perform at least some of the functions and processes of a method described herein.

Some embodiments are also directed to computer readable media comprising a data structure that is operated upon by a program executable on a computer system. The program operates on the data structure to perform a portion of a process to fabricate an integrated circuit including circuitry described by the data structure. The circuitry described in the data structure includes providing a method of taking a continuous frequency measurement of different domains in a heterochronous system in which the frequency in at least one domain of two different clock domains changes or varies at a rate exceeding a minimal frequency error range.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for transmitting data in a source synchronous bus interface, comprising:
   transmitting a plurality of data packets from a transmitter to a receiver in the source synchronous bus interface, wherein the data packets are synchronized to a data clock signal having a regular period; and
   transmitting a gated clock signal with the data packets, wherein the gated clock signal is gated to produce data valid and data invalid states such that a data packet sent during a rising transition of the gated clock signal is a valid data packet, and a data packet sent during a non-transitioning period of the gated clock signal is an invalid data packet.

2. The method of claim 1 wherein the gated clock signal creates one gated clock cycle per valid data period.

3. The method of claim 1 wherein the non-transitioning state of the period of the gated clock signal comprises a low clock state held low for one or more successive data packet transmission periods.

4. The method of claim 1 further comprising:
   encoding in the transmitter, a data object representing a number of consecutive valid data packets;
   transmitting the data object to the receiver for decoding in the receiver; and
   passing valid data packets for a number of clock cycles corresponding to the data object without requiring transitions of the data clock signal to latch the valid data packets.

5. The method of claim 4 wherein the data object comprises a number representing the number of consecutive data packets in a burst of valid data from the transmitter to the receiver.

6. The method of claim 2 further comprising generating in the receiver, an internal clock signal marking at least one of the start or end of a valid data period of the gated clock signal.

7. The method of claim 1 wherein the gated clock signal comprises the periodic data clock gated with a data valid signal so that one clock cycle is passed per valid data period and no clock cycles are passed during invalid data periods.

8. A method for transmitting data in a source synchronous bus interface, comprising:
    transmitting a plurality of data packets from a transmitter to a receiver in the source synchronous bus interface, wherein the data packets are synchronized to a data clock signal having a regular period,
    transmitting a gated clock signal with the data packets, wherein the gated clock signal is gated to produce data valid and data invalid states such that a data packet sent during a rising transition of the gated clock signal is a valid data packet, and a data packet sent during a non-transitioning period of the gated clock signal is an invalid data packet;
    comparing consecutive data packets of the plurality of data packets with one another to determine any difference between the consecutive data packets; and
    passing valid data based on the encoded gated clock signal and the difference between the consecutive data packets.

9. The method of claim 8 wherein a data packet that is compared and determined to be different from a previous data packet is recognized as invalid data and is not transmitted.

10. The method of claim 8 wherein the gated clock signal creates one clock cycle per valid data period.

11. The method of claim 8 wherein the non-transitioning state of the period of the gated clock signal comprises a low clock state held low for one or more successive data packet transmission periods.

12. An apparatus for transmitting data in a source synchronous bus interface, comprising:
    a transmitter transmitting a plurality of data packets from a transmitter to a receiver in the source synchronous bus interface, wherein the data packets are synchronized to a data clock signal having a regular period, and wherein the data packets comprise valid data and invalid data;
    an encoder encoding a data valid and data invalid state of the data in a clock transition state of a gated clock signal to eliminate a need to transmit a separate data valid signal over the interface;
    a gate circuit coupled to the transmitter and gating the gated clock signal to exhibit a non-regular period;
    a transmitter transmitting the gated clock signal with the data packets, wherein the gated clock signal is gated to produce data valid and data invalid states such that a data packet sent during a rising transition of the gated clock signal is a valid data packet, and a data packet sent during a non-transitioning period of the gated clock signal is an invalid data packet.

13. The apparatus of claim 12 wherein the clock transition state comprises a rising edge or a falling edge of the clock signal, and wherein a presence of the rising or falling edge indicates the data valid state and the absence of the rising or falling edge indicates the data invalid state.

14. The apparatus of claim 12 wherein the non-transitioning state of the period of the gated clock signal comprises a low clock state held low for one or more successive data packet transmission periods.

15. The apparatus of claim 12 further comprising:
    an encoder coupled to the transmitter and encoding a data object representing a number of consecutive valid data packets; and
    an interface transmitting the data object to the receiver for decoding in the receiver and passing valid data packets for a number of gated clock cycles corresponding to the data object without requiring transitions of the data clock signal to latch the valid data packets.

16. The apparatus of claim 15 wherein the data object comprises a number representing the number of consecutive data packets in a burst of valid data from the transmitter to the receiver.

17. The apparatus of claim 12 further comprising an internal clock generator associated with the receiver and configured to generate an internal clock signal marking at least one of the start or end of a valid data period of the gated clock signal.

18. The apparatus of claim 12 further comprising a comparator coupled to the transmitter, the comparator configured to compare consecutive data packets of the plurality of data packets with one another to determine any difference between the consecutive data packets, and to allow transmission of valid data based on the encoded clock signal and the difference between the consecutive data packets.

* * * * *